United States Patent
Yu et al.

(10) Patent No.: US 12,012,166 B2
(45) Date of Patent: Jun. 18, 2024

(54) UNMANNED GUIDED CARRIER AND CHASSIS THEREFOR

(71) Applicant: HANGZHOU HIKROBOT CO., LTD., Hangzhou (CN)

(72) Inventors: Wentao Yu, Hangzhou (CN); Chao Wu, Hangzhou (CN); Hui Jiang, Hangzhou (CN)

(73) Assignee: HANGZHOU HIKROBOT CO., LTD., Zhejiang (CN)

(*) Notice: Subject to any disclaimer, the term of this patent is extended or adjusted under 35 U.S.C. 154(b) by 686 days.

(21) Appl. No.: 17/288,818

(22) PCT Filed: Oct. 28, 2019

(86) PCT No.: PCT/CN2019/113758
§ 371 (c)(1),
(2) Date: Apr. 26, 2021

(87) PCT Pub. No.: WO2020/088420
PCT Pub. Date: May 7, 2020

(65) Prior Publication Data
US 2021/0354771 A1    Nov. 18, 2021

(30) Foreign Application Priority Data
Nov. 2, 2018 (CN) .......................... 201821803162.9

(51) Int. Cl.
*B62D 63/04* (2006.01)
*B60G 11/50* (2006.01)

(52) U.S. Cl.
CPC .............. *B62D 63/04* (2013.01); *B60G 11/50* (2013.01)

(58) Field of Classification Search
CPC ...... B62D 63/02; B62D 63/04; B62D 63/068; B60G 11/50
See application file for complete search history.

(56) References Cited

U.S. PATENT DOCUMENTS 6,099,004 A * 8/2000 Lin ...................... B60G 13/003
                                                              280/124.152
7,464,775 B2 * 12/2008 Clemens .............. B60K 17/356
                                                                    180/8.1
(Continued)

FOREIGN PATENT DOCUMENTS

CN         201151425        11/2008
CN         101386253        3/2009
(Continued)

OTHER PUBLICATIONS

Extended European Search Report issued in Corresponding European Application No. 19878734.3, dated Nov. 23, 2021.
(Continued)

*Primary Examiner* — Tony H Winner
(74) *Attorney, Agent, or Firm* — NORTON ROSE FULBRIGHT US LLP

(57) ABSTRACT

Disclosed is a chassis for an unmanned guided carrier, wherein the chassis comprises a chassis body (100), two driving wheel set modules (200) and a torsion shaft caster module (300) mounted on the chassis body (100), the torsion shaft caster module (300) comprises a torsion shaft (310) rotatably mounted on the chassis body (100) and two supports (320), one end of each of the two supports (320) is fixed to one of both ends of the torsion shaft (310) respectively, an universal wheel (330) is mounted at the other end of each of the two supports (320), an elastic member (340) is provided between said other end of each of the two supports (320) mounted with the universal wheel (330) and the chassis body (100), the elastic member (340) applies an elastic force to the universal wheel (330) to make it cling to a ground.

11 Claims, 2 Drawing Sheets

(56) References Cited

U.S. PATENT DOCUMENTS

| | | | | |
|---|---|---|---|---|
| 9,260,138 | B1 * | 2/2016 | Briceno | B62D 25/088 |
| 9,988,113 | B2 * | 6/2018 | Habernegg | B62D 63/061 |
| 10,399,598 | B2 * | 9/2019 | Tanaka | G01S 17/931 |
| 2009/0008176 | A1 | 1/2009 | Worman, Jr. | |
| 2009/0033142 | A1 * | 2/2009 | Bitz | B60B 35/06 |
| | | | | 301/127 |
| 2022/0371501 | A1 * | 11/2022 | Augustsson | B62D 63/025 |

FOREIGN PATENT DOCUMENTS

| | | |
|---|---|---|
| CN | 204726551 | 10/2015 |
| CN | 105774457 | 7/2016 |
| CN | 108068910 | 5/2018 |
| CN | 209064231 | 7/2019 |
| CN | 209225269 | 8/2019 |
| DE | 2946391 | 5/1980 |
| DE | 102014202095 | 8/2015 |
| DE | 381244 | 9/2023 |
| EP | 2914441 | 9/2015 |
| WO | WO 2018/189106 | 10/2018 |

OTHER PUBLICATIONS

International Search Report and Written Opinion issued in Corresponding PCT Application No. PCT/CN2019/113758, dated Jan. 23, 2020 (English Translation provided).

* cited by examiner

UNMANNED GUIDED CARRIER AND CHASSIS THEREFOR

CROSS REFERENCE TO RELATED APPLICATIONS

The present application is a national phase application under 35 U.S.C. § 371 of International Application No. PCT/CN2019/113758, filed Oct. 28, 2019, which claims the benefit of priority to Chinese patent application No. 201821803162.9 filed with the China National Intellectual Property Administration on Nov. 2, 2018 and entitled "UNMANNED GUIDED CARRIER AND CHASSIS THEREFOR", each of which are incorporated herein by reference in their entirety.

TECHNICAL FIELD

The present application relates to the technical field of warehousing and logistics, in particular to an unmanned guided carrier and a chassis therefor.

BACKGROUND

With the development of the logistics industry, the transshipment and storage of goods require more considerations. Large amounts of goods are usually stored in warehouses. In order to reduce the labor cost in the logistics process, more and more logistics companies currently use cargo handling trolleys to replace manual handling, so as to achieve the transfer of goods. The cargo handling trolley can realize online work for a long time, and it can undoubtedly achieve efficient operation results.

The current cargo handling trolleys are usually unmanned guided carriers. The chassis of unmanned guided carrier can realize the movement of unmanned guided carrier. In order to realize more flexible cargo handling, the chassis of the unmanned guided carrier is omnidirectional, that is, a chassis that can achieve omnidirectional movement. Specifically, the chassis of the unmanned guided carrier comprises four driving wheel set modules, and each driving wheel set module is a dual-wheel differential module.

In the actual traveling process, due to uneven ground or uneven load on the chassis, the chassis of the unmanned guided carrier using the four drive wheel set modules may be greatly shaken, which leads to the instability of the unmanned guided carrier. In addition, the price of the drive wheel set module is relatively high, and the use of four drive wheel set modules will undoubtedly lead to a higher cost of the entire chassis.

SUMMARY

The embodiment of the present application discloses an unmanned guided carrier and a chassis therefor, so as to solve the problems that the chassis of the current unmanned guided carrier is easy to shake and the cost is high.

In order to solve the above problems, the embodiments of the application adopt the following technical solutions:

a chassis for an unmanned guided carrier, wherein the chassis comprises a chassis body, two driving wheel set modules and a torsion shaft caster module mounted on the chassis body, the torsion shaft caster module comprises a torsion shaft rotatably mounted on the chassis body and two supports, one end of each of the two supports is fixed to one of both ends of the torsion shaft respectively, an universal wheel is mounted at the other end of each of the two supports, an elastic member is provided between said other end of each of the two supports mounted with the universal wheel and the chassis body, the elastic member applies an elastic force to the universal wheel to make it cling to a ground.

Optionally, the torque shaft caster module is provided between the two driving wheel set modules, the two driving wheel set modules are each arranged on a center line of the chassis body which extends in a length direction of the chassis body.

Optionally, both the universal wheels are provided on both sides of the center line of the chassis body respectively which extends in the length direction of the chassis body.

Optionally, the torsion shaft caster module is mounted on the chassis body with the center line as a symmetrical axis.

Optionally, a top surface of the chassis body is a plane, and a projection of the chassis body in a direction perpendicular to the top surface is of a shape of square, rectangular or circular.

Optionally, the torsion shaft caster module further comprises a mounting plate being fixed on the chassis body, and the torsion shaft is rotatably mounted on the mounting plate.

Optionally, the elastic member is a compression spring.

Optionally, a damping member is provided between said other end of each of the the two supports mounted with the universal wheel and the chassis body.

Optionally, the driving wheel set module comprises a base body and a differential driving body, the base body is mounted on the chassis body, the differential driving body comprises two differentially matched driving wheels, and the differential driving body is rotatably mounted on the base body, the two driving wheels are located on both sides of a rotation center of the differential driving body respectively.

Optionally, the base body comprises a mounting base plate, a slewing bearing and a connecting base, the mounting base plate is mounted on the chassis body, the connecting base is rotationally connected with the mounting base plate through the slewing bearing, and a rotation plane of the slewing bearing is perpendicular to a rotation direction of the differential driving body, and the differential driving body is rotatably connected to the connecting base.

An unmanned guided carrier comprises any of the chassis described above.

The technical solutions adopted in the embodiments of the present application can achieve the following beneficial effects:

In the chassis of the unmanned guided vehicle disclosed in the embodiments of the present application, when the chassis is tilted to one side, the universal wheel on the side is compressed, the elastic member on the side contracts, which in turn causes the support on the side to rotate. Then the torsion shaft will drive the support on the other side to rotate, which in turn causes the elastic member on the other side to be compressed, the elastic members on both sides are compressed simultaneously, and the elastic members on both sides provide support at the same time, which can better balance the support of the two universal wheels, thereby reducing the amplitude of the left and right shaking of the chassis. It can be seen that the elastic members at both ends of the torsion shaft caster module can enable the universal wheel to achieve elastic support, and thus can reduce the sloshing amplitude of the chassis through linkage deformation, which can better solve the sloshing problem. Moreover, since only two driving wheel set modules are used, the chassis disclosed in this embodiment can also reduce the cost of the chassis compared to the chassis using four driving modules.

BRIEF DESCRIPTION OF THE DRAWINGS

In order to more clearly describe the technical solutions of the embodiments of the present application and of the prior art, drawings that need to be used in embodiments and the prior art will be briefly described below. Obviously, the drawings provided below are for only some embodiments of the present application. Those skilled in the art can also obtain other drawings based on these drawings without any creative efforts.

In the drawings.

REFERENCE NUMERALS

100—chassis body,
200—driving wheel set module,
210—base body,
211—mounting base plate,
212—slewing bearing,
213—connecting base,
220—differential driving body,
221—driving wheels,
222—driving motor,
230—pin shaft,
300—torque shaft caster module,
310—torque shaft,
320—support,
330—universal wheel,
340—elastic member,
350—mounting plate,
351—shaft sleeve,
360—damping member.

DETAILED DESCRIPTION

In order to make the objectives, technical solutions and advantages of the present application clearer, the present application will be described clearly and completely below with reference to the drawings and embodiments. Obviously, the described embodiments are merely a part of rather than all of the embodiments of the present application. All other embodiments obtained by those skilled in the art based on the embodiments of the present application without any creative effort fall within the scope of protection of the present application.

The technical solutions disclosed in the embodiments of the present application will be described in detail below in conjunction with the drawings.

Figure 1:
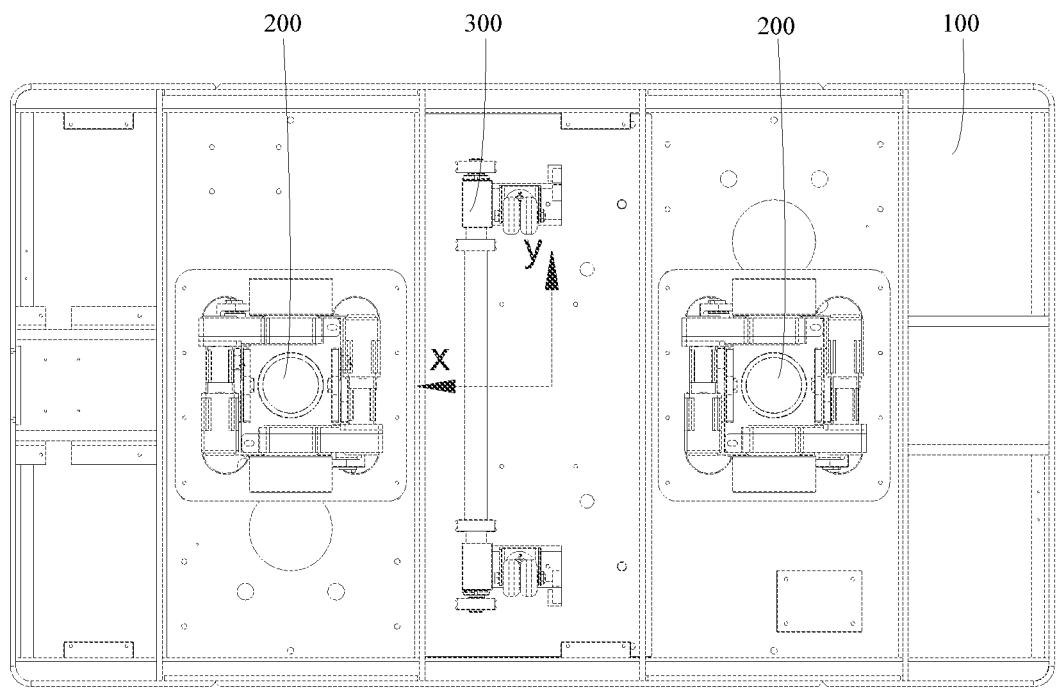
FIG. 1 is a bottom view of the chassis of an unmanned guided carrier disclosed in an embodiment of the present application.
Figure 2:
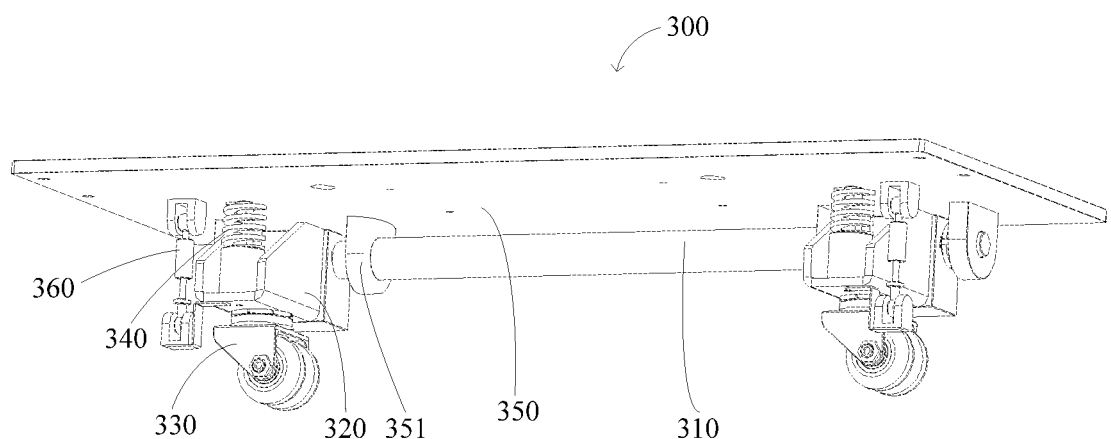
FIG. 2 is a schematic structural diagram of a torsion shaft caster module disclosed in an embodiment of the present application.
Figure 3:
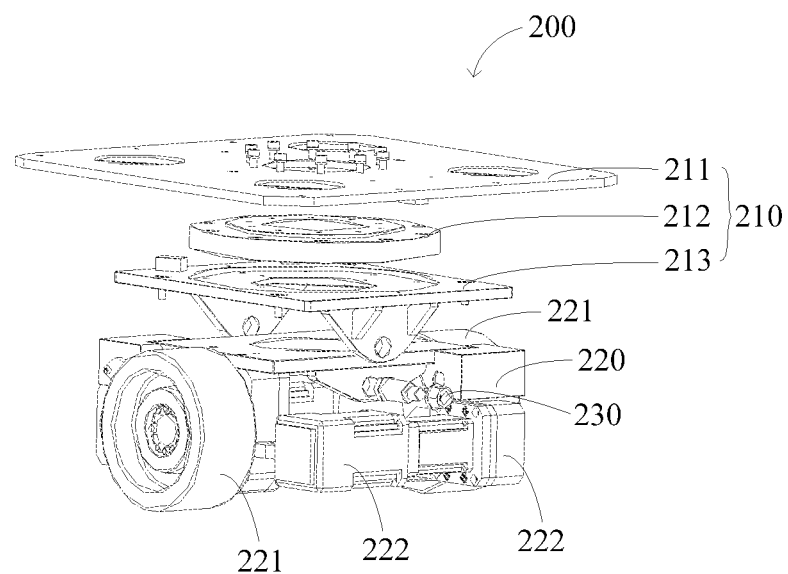
FIG. 3 is an exploded schematic view of a driving wheel set module disclosed in the embodiment of the present application.

Referring to FIGS. 1-3, the embodiment of the present application discloses a chassis for an unmanned guided carrier, which comprises a chassis body 100, a torque shaft caster module 300 and two driving wheel set modules 200.

The chassis body 100 is the main part of the chassis and provides mounting locations for other components of the unmanned guided carrier. The torque shaft caster module 300 and two driving wheel set modules 200 are mounted on the chassis body 100. The driving wheel set module 200 provides driving force for the chassis to move forward. The two driving wheel set modules 200 are the functional members that enable the chassis to move forward, backward and to steer.

The torsion shaft caster module 300 may comprise a torsion shaft 310 rotationally mounted on the chassis body 100 and two supports 320. The torsion shaft 310 is rotatably mounted on the chassis body 100 and can rotate around its own axis. One end of each of the two supports 320 is fixed to one of both ends of the torsion shaft 310 respectively. In this case, the two supports 320 can both be driven by the torsion shaft 310 and rotate around the axis of the torsion shaft 310 at the same time with the torsion shaft 310. An universal wheel 330 is mounted at the other end of each of the two supports 320, and the universal wheel 330 is in contact with the ground. The end of each of the two supports 320 mounted with the universal wheel 330 may be considered as a swing end and can swing relative to the end connected with the torsion shaft 310.

In this embodiment, an elastic member 340 is provided between the end of each of the two supports 320 mounted with the universal wheel 330 and the chassis body 100, and the elastic member 340 applies an elastic force to the universal wheel 330 to make it cling to the ground. The elastic member 340 realizes the elastic support between the end of supports 320 mounted with the universal wheel 330 and the chassis body 100, so that the end of supports 320 mounted with the universal wheel 330 can be elastic. One end of each of the two supports 320 is fixed on the torque shaft 310, so the rotation of torque shaft 310 can cause the linkage of the two supports 320.

When the chassis adopting the torque shaft caster module 300 travels, when the chassis is tilted to one side, the universal wheel 330 on that side is compressed, causing the elastic member 340 on that side to contract, which in turn causes the end of the support 320 on that side mounted with the universal wheel 330 swing toward the chassis body 100. At this time, the end of the support 320 on that side connected to the torsion shaft 310 rotates around the axis of the torsion shaft 310, thereby causing the support 320 on that side drives the torsion shaft 310 to rotate around the axis of the torsion shaft 310, and then the torsion shaft 310 drives the support 320 on the other side to rotate, thereby causing the elastic member 340 on the other side to be compressed, and the elastic members 340 on both sides are simultaneously compressed, the elastic members 340 on both sides simultaneously provide supporting force, which can better balance the support of the two universal wheels 330, reducing the amplitude of left and right shaking of the chassis. It can be seen that the elastic members 340 at both ends of the torsion shaft caster module 300 can enable the universal wheels 330 to achieve an elastic support, and thus can reduce the sloshing amplitude of the chassis through the linkage deformation, thereby better solving the sloshing problem.

The two driving wheel set modules 200 and two universal wheels 330 support the entire chassis. The two universal wheels 330 can ensure that the chassis has a good walking and steering function. The two driving wheel set modules 200 provide the power for the chassis to walk. Compared with the current chassis using four drive modules, the chassis disclosed in this embodiment can also reduce the cost of the chassis.

The torsion shaft caster module 300 and the two drive wheel set modules 200 can form a four-point support, which ensures the chassis to travel more stably, and to a certain extent, which also reduces the sloshing during chassis traveling.

There are many relative positions between torque shaft caster module 300 and the two driving wheel set modules 200. In a specific implementation, the torque shaft caster module 300 is provided between the two driving wheel set modules 200, and the two driving wheel set modules 200 are provided on the center line of the chassis body 100. The center line herein extends along the length direction of the chassis body 100. Alternatively, the torque shaft caster module 300 can be provided on either end of the chassis body 100, and it does not need to be provided between the two driving wheel set modules 200. The two driving wheel set modules 200 can be both located on the same side of the torque shaft caster module 300.

The two universal wheels 330 of the torque shaft caster module 300 can be set on both sides of the center line of chassis body 100 respectively, which can undoubtedly further improve the balance of the support for chassis body 100 and make the chassis walk more smoothly. In a more preferred solution, the torsion shaft caster module 300 is mounted on the chassis body 100 with the center line as the symmetrical axis. In this case, the two universal wheels 330 of the torque shaft caster module 300 and the two driving wheel set modules 200 are symmetrically supported, which can further improve the stability of the chassis in the process of moving.

In order to facilitate the mounting of the torque shaft caster module 300, in one implementation, the torque shaft caster module 300 disclosed in this embodiment may also comprise a mounting plate 350 being fixed on the chassis body 100, and the torque shaft 310 is rotatably mounted on the mounting plate 350. Specifically, the mounting plate 350 is provided with a shaft sleeve 351, and the torsion shaft 310 is rotatably mounted in the shaft sleeve 351. The shaft sleeve 351 can be directly rotationally fitted with the torsion shaft 310, alternatively the shaft sleeve 351 is a bearing sleeve provided with a bearing therein, and the torsion shaft 310 can be rotationally assembled with the bearing sleeve through the bearing. When the shaft sleeve 351 is worn after working for a long time, the maintenance personnel can separately remove the mounting plate 350 and replace it, so as to facilitate the maintenance.

In order to further improve the stability of elastic member 340 in the process of expansion and contraction, in one implementation, a damping member 360 may be provided between the other end of two supports 320 and the chassis body 100 respectively. The damping member 360 may play the role of damping, which can further reduce the shaking of the chassis in the process of traveling.

In the above torque shaft caster module 300, the elastic member 340 may be a compression spring, a rubber elastic block, etc., and the embodiments of the present application do not limit the specific types of the elastic member 340.

In this embodiment, the two driving wheel set modules 200 each can be a dual-wheel differential driving module, which can realize more flexible operation of chassis. Specifically, each of the driving wheel set modules 200 comprises two driving wheels and two driving mechanisms (for example, driving motor 222). The two driving mechanisms drive two driving wheels to roll respectively, and the rotating speeds of the two driving wheels are different, so as to realize differential matching.

Referring again to FIG. 3, the embodiment of the application discloses a driving wheel set module 200, which comprises s base body 210 and s differential driving body 220.

The base body 210 is the basic component for driving the wheel set modules 200. The base body 210 is connected with the chassis body 100. The differential driving body 220 is the main driving body of the driving wheel set modules 200. The differential driving body 220 comprises two driving wheels 221 which can be differentially matched, realizing the differential speed walking, which is conducive to improving the flexibility of the chassis walking.

The differential driving body 220 is rotationally provided on the base body 210, and the two driving wheels 221 may be located on both sides of the rotation center of the differential driving body 220 respectively. In the specific working process, the differential driving body 220 can rotate relative to the base body 210, and when passing through the uneven area of the ground, the differential driving body 220 can exhibit more flexible rotation to realize a better adaption to the uneven ground of the two driving wheels 221 in the same driving wheel set module 200, achieving a better driving effect, and reducing the suspension and slipping of some driving wheels 221 of the driving wheel set modules 200.

In the driving wheel set modules 200, the two driving wheels 221 of the differential driving body 220 are located on both sides of the rotation center of the differential driving body 220 respectively, and then the contact between the two driving wheels 221 and the ground can be adjusted by rotation, which reduces suspension, slipping of the driving wheels when traveling on uneven ground, which may improve the accuracy of the entire chassis.

In one implementation, the base body 210 may comprise a mounting base plate 211, a slewing bearing 212 and a connecting base 213, the mounting base plate 211 is mounted on the chassis body 100, the connecting base 213 is rotationally connected with the mounting base plate 211 through the slewing bearing 212, and a rotation plane of the slewing bearing 212 is perpendicular to a rotation direction of the differential driving body 220, and the differential driving body 220 is rotatably connected to the connecting base 213. Specifically, the differential driving body 220 may be hinged with the connecting base 213 through the pin shaft 230, so as to realize the rotation of the differential driving body 220 relative to the connecting base 213. In the above solution, the driving wheels 221 of the driving wheel set module 200 can travel differentially on the ground, which can improve the flexibility of chassis traveling.

In this embodiment, the driving wheel set module 200 may also be a steering wheel driving module widely used in forklifts. This embodiment does not limit the specific types of the driving wheel set modules 200, and other structures that can realize the simultaneous landing of two differential wheels can also be used.

In this embodiment, the structure of the chassis body 100 may be various. For example, the top surface of the chassis body 100 may be a plane, and the projection of the chassis body 100 in the direction perpendicular to the top surface is of a shape of square, rectangular or circular. Of course, the chassis body 100 can be of other shapes, and this embodiment does not limit the specific shape of the chassis body 100. When the chassis body 100 is of a regular geometric structure, the two universal wheels 330 of the two driving wheel set modules 200 and torsion shaft caster module 300 are provided symmetrically with respect to the geometric center of the chassis body 100.

In this embodiment, the top surface of the chassis body 100 refers to the surface of the chassis body 100 away from the ground. The bottom surface of chassis body 100 refers to the surface of chassis body 100 facing the ground. The driving wheel set modules 200 and torsion shaft caster module 300 mentioned above are mounted on the bottom surface of the chassis body 100 to support the chassis body 100.

Based on the chassis disclosed by the embodiment of the application, the embodiment of the application discloses an unmanned guided carrier, which comprises the chassis described above.

The above embodiments of the present application mainly describe the differences between the various embodiments. As long as the different optimization features of the various embodiments are not contradictory, they can be combined to form a better embodiment. Considering the brevity of the text, it will not be repeated here.

The above is only an embodiment of the present application and is not used to limit the present application. For those skilled in the art, the present application may have various changes and variations. Any modification, equivalent substitution, improvement, etc. made within the spirit and principle of the application shall be comprised in the scope of the claims of the application.

What is claimed is:

1. A chassis for an unmanned guided carrier, wherein the chassis comprises a chassis body (100), two driving wheel set modules (200) and a torsion shaft caster module (300) mounted on the chassis body (100), the torsion shaft caster module (300) comprises a torsion shaft (310) rotatably mounted on the chassis body (100) and two supports (320), one end of each of the two supports (320) is fixed to one of both ends of the torsion shaft (310) respectively, an universal wheel (330) is mounted at the other end of each of the two supports (320), an elastic member (340) is provided between said other end of each of the two supports (320) mounted with the universal wheel (330) and the chassis body (100), the elastic member (340) applies an elastic force to the universal wheel (330) to make it cling to a ground.

2. The chassis according to claim 1, wherein the torque shaft caster module (300) is provided between the two driving wheel set modules (200), the two driving wheel set modules (200) are each arranged on a center line of the chassis body (100) which extends in a length direction of the chassis body (100).

3. The chassis according to claim 1, wherein both the universal wheels (330) are provided on both sides of a center line of the chassis body (100) respectively which extends in the length direction of the chassis body (100).

4. The chassis according to claim 3, wherein the torsion shaft caster module (300) is mounted on the chassis body (100) with the center line as a symmetrical axis.

5. The chassis according to claim 1, wherein a top surface of the chassis body (100) is a plane, and a projection of the chassis body (100) in a direction perpendicular to the top surface is of a shape of square, rectangular or circular.

6. The chassis according to claim 1, wherein the torsion shaft caster module (300) further comprises a mounting plate (350) being fixed on the chassis body (100), and the torsion shaft (310) is rotatably mounted on the mounting plate (350).

7. The chassis according to claim 1, wherein the elastic member (340) is a compression spring.

8. The chassis according to claim 1, wherein a damping member (360) is provided between said other end of each of the two supports (320) mounted with the universal wheel (330) and the chassis body (100).

9. The chassis according to claim 1, wherein the driving wheel set module (200) comprises a base body (210) and a differential driving body (220), the base body (210) is mounted on the chassis body (100), the differential driving body (220) comprises two differentially matched driving wheels (221), and the differential driving body (220) is rotatably mounted on the base body (210), the two driving wheels (221) are located on both sides of a rotation center of the differential driving body (220) respectively.

10. The chassis according to claim 9, wherein the base body (210) comprises a mounting base plate (211), a slewing bearing (212) and a connecting base (213), the mounting base plate (211) is mounted on the chassis body (100), the connecting base (213) is rotationally connected with the mounting base plate (211) through the slewing bearing (212), and a rotation plane of the slewing bearing (212) is perpendicular to a rotation direction of the differential driving body (220), and the differential driving body (220) is rotatably connected to the connecting base (213).

11. An unmanned guided carrier, comprising the chassis according to claim 1.

* * * * *